(No Model.)
G. H. NORTHWAY.
SAW.
No. 245,090. Patented Aug. 2, 1881.
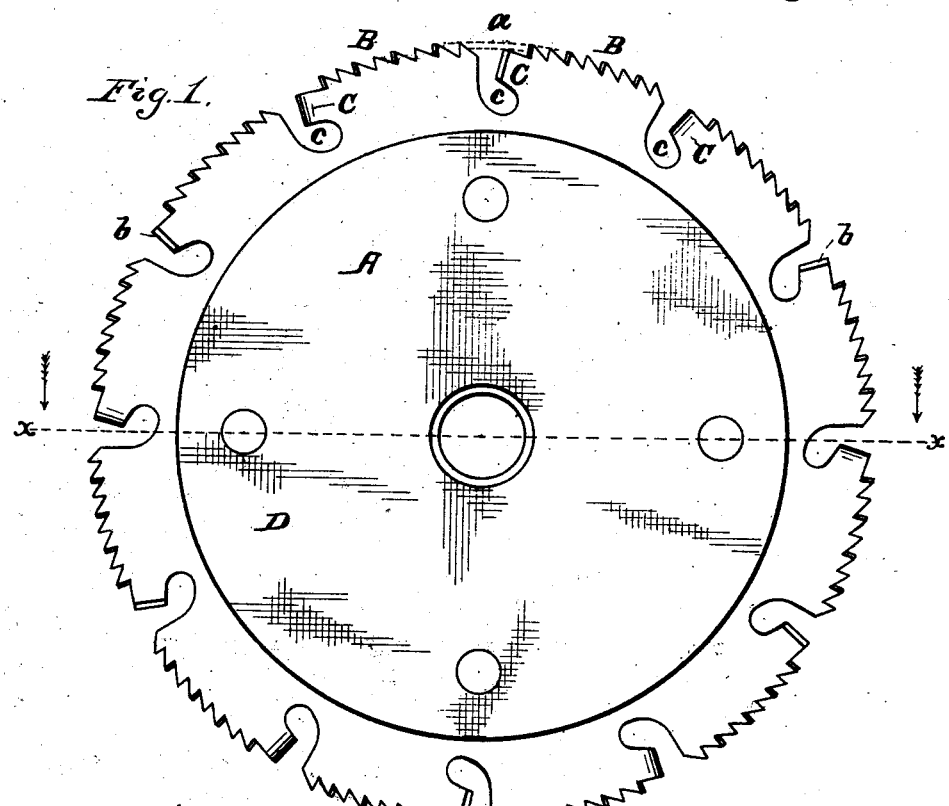
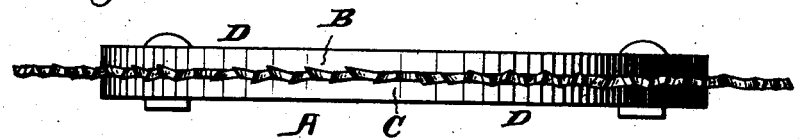
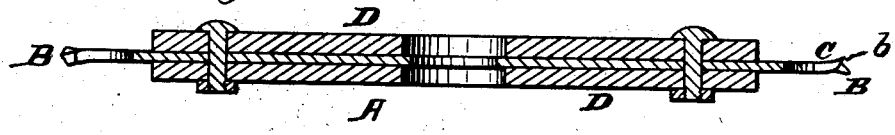
Witnesses.
Henry Frankfurter.
S. W. Morse.
Inventor.
George H. Northway
per F. F. Warren, his
Attorney.

UNITED STATES PATENT OFFICE.

GEORGE H. NORTHWAY, OF CHICAGO, ILLINOIS, ASSIGNOR OF TWO-THIRDS TO HENRY E. MOORE AND HENRY SCHMID, BOTH OF SAME PLACE.

SAW.

SPECIFICATION forming part of Letters Patent No. 245,090, dated August 2, 1881.

Application filed April 22, 1881. (No model.)

*To all whom it may concern:*

Be it known that I, GEORGE H. NORTHWAY, of Chicago, in the county of Cook and State of Illinois, have invented certain new and useful Improvements in Saws, of which the following, in connection with the accompanying drawings, is a specification.

In the drawings, Figure 1 is a side view of a circular saw embodying my invention. Fig. 2 is an edge view thereof, and Fig. 3 is a section in the plane of the line $x\ x$, viewed in the direction indicated by the arrow there shown.

Like letters of reference indicate like parts.

My purpose is to make a saw which will make a smooth cut, or, in other words, which will plane the sawed surfaces; and my invention consists in the means, substantially as hereinafter described, which I employ for that purpose.

A represents a circular saw. B B are the sawing-teeth, and C C the planing-teeth.

The saw, in the example shown, is adapted for crosscut-sawing, and the teeth B B are made and set as usual in saws of that class.

Between the teeth C C are a number or series of teeth, B B, as shown.

The extreme outer point of each tooth or blade C C lies in a circle somewhat smaller than the circle in which the points of the teeth B B lie, as indicated at $a$, and both of these circles have the center of the saw as a center. By this means the teeth or blades C C, lying as they do between and not projecting so far as the teeth B B, are prevented from performing any of the work of sawing, and that work is done wholly by the teeth B B. As the teeth C C do none of the sawing their outer points do not roughen the surface sawed; but their radial or cutting edges smooth off the roughness produced by the sawing-teeth B B, it being understood that the planers C C are set out laterally far enough for that purpose. The teeth C C may therefore also be termed "blades" or "planers," as will hereinafter more fully appear. The cutting-edges of the teeth or blades C C are beveled or chisel-shaped, as shown at $b$, and the lower end or corner of each of these cutting-edges stands, by preference, a little way forward of the upper end or corner, or forward of a radial line running to the upper end or corner thereof, as indicated in Fig. 1. Below and in front of each tooth or blade C C is a deep notch or space, $c$, to admit of the said teeth or blades being properly set.

I deem it best to make the rear part or portion of each blade somewhat broader or deeper than its front or cutting edge, so that in sharpening them the filing down of the upper edge will not result in diminishing the length or depth of the cutting-edge, it being understood that, in sharpening, the cutting-edge is filed or honed, as well as the upper edge, the latter being cut down, so that it will preserve its proper relation to the teeth B B as the latter are worn down by work or by repeated sharpening.

I set the cutting-edges of the blades C C out laterally, one in one direction and the other in the other alternately, so that each alternate edge will stand out one a little way from one side or face of the saw, and the other from the other side or face thereof, as indicated in the drawings, and all the parts of each cutting-edge stand out equally, so that the said edge, and that only, or no other part of the blade, shall be in contact with the wood to be cut. By this means friction and burning are avoided.

To avoid vibration I place on each side of the saw a thick rigid collar, D, extending as near to the teeth and blades as may be expedient, considering the nature of the work to be done.

It is obvious from the foregoing description that the blades C C, constructed substantially as specified, may be employed also in connection with rip-saws and saws adapted to do resawing. It is also obvious that for some kinds of work, such as resawing, the collars D D should be tapered to a thin edge instead of having thick or abrupt outer edges.

I am aware that saws have heretofore been provided with planer-teeth set into the sides of the saw instead of being cut into the periphery thereof. I am also aware that planer-teeth have heretofore been cut into the periphery of the saw, and that the points of all the teeth have in some such cases extended an equal distance from the center of the saw. I am also aware that planer-teeth cut into the periphery of the saw have not extended outwardly as far as the sawing-teeth; but these shorter teeth have in such cases been grooved vertically on their working-edges and shouldered laterally from the said edges rearwardly. I do not, therefore, here intend to claim any of these known features of construction; but,

Having thus described my invention, what I claim as new, and desire to secure by Letters Patent, is—

The combination, in a saw, of the sawing-teeth B B, and of the planing-blades C C, all cut in the working-edge of the saw, and the points of the teeth B B extending beyond the points of the teeth C C, and the latter having their whole planing or working edges set out laterally in opposite directions, alternately, from the sides or faces of the saw, and also having on their planing-edges a single bevel, and the said edges extending laterally farther than the whole remaining portion of the said blades, in connection with the spaces c c cut underneath the forward part of the said blades, substantially as and for the purposes specified.

GEORGE H. NORTHWAY.

Witnesses:
F. F. WARNER,
H. FRANKFURTER.